United States Patent [19]

Steutermann

[11] 4,387,422
[45] Jun. 7, 1983

[54] CONTROL SYSTEM PROCESS CONTROLLER

[76] Inventor: Edward M. Steutermann, 1332 S. Second St., Louisville, Ky. 40208

[21] Appl. No.: 156,071

[22] Filed: Jun. 3, 1980

[51] Int. Cl.³ .......................... G05B 13/00; F24J 3/02
[52] U.S. Cl. .................................... 364/183; 126/422;
422/62; 422/110; 364/164; 364/172
[58] Field of Search ................ 364/108, 118, 164–166,
364/172, 183; 126/419, 421, 422, 423; 324/438;
340/521, 522; 318/639; 23/230 A, 230 B;
422/62, 110

[56] References Cited

U.S. PATENT DOCUMENTS

| | | | |
|---|---|---|---|
| 3,759,820 | 9/1973 | Boyd | 364/108 X |
| 3,940,593 | 2/1976 | Bleak et al. | 364/118 X |
| 4,008,386 | 2/1977 | Ross | 364/118 |
| 4,126,122 | 11/1978 | Bross | 126/422 |
| 4,257,395 | 3/1981 | Wieder | 126/422 |

Primary Examiner—Joseph F. Ruggiero

[57] ABSTRACT

A control system for operating process controller means to initiate corrective action to maintain a selected process condition in a selected range including first sensor means to sense the process condition and provide a first condition output signal, a second sensor means to sense a second condition which affects the process condition to provide a second condition output signal reflective of the second condition, amplifier means to selectively amplify the process condition output signal and provide a modified process condition output signal, summing means to selectively sum the process condition output signal and the second condition output signal and provide a reference signal, comparator means to compare the modified process condition output signal and the reference signal to provide a first comparator output signal when the modified process condition output signal exceeds the reference signal and to provide a second output signal when the reference signal exceeds the modified process condition output signal, operator means to selectively activate the process controller means in response to the first and second signals to modify the process condition.

7 Claims, 5 Drawing Figures

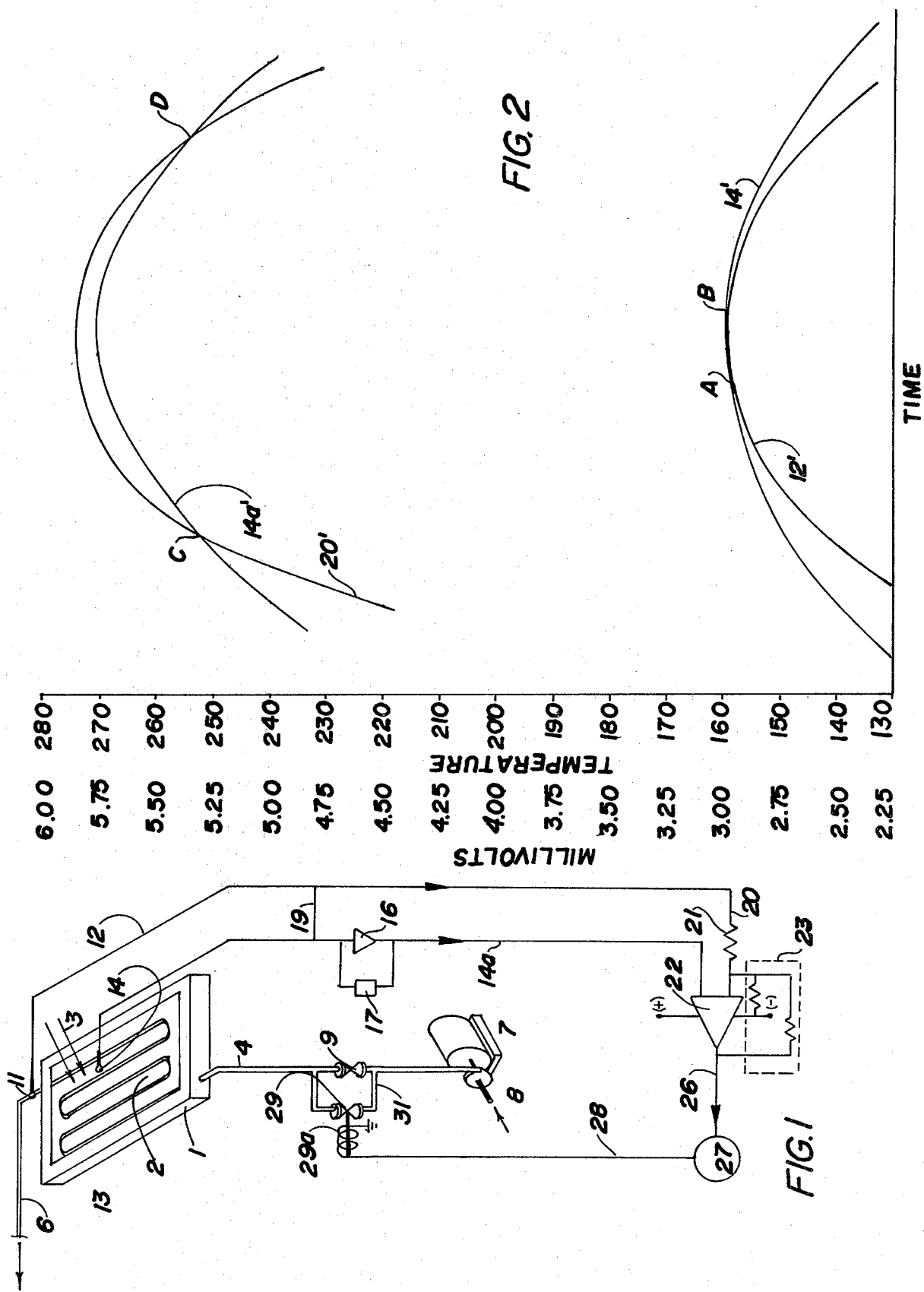

CONTROL SYSTEM PROCESS CONTROLLER

BACKGROUND OF THE INVENTION

The present invention relates to control apparatus and method for controlling certain processes including, for example, chemical processes or temperature related processes. Devices and methods within the scope of the present invention can be utilized as a primary means of control or can, advantageously, be utilized as supplemental control means for condition responsive control means commonly utilized in various processes.

Numerous prior art arrangements are known for controlling processes, for example both chemical and thermal, where a sensor means is provided to sense a variable condition of the process and the output from the sensor is fed back to a control means to modify operator devices to modify the variable, for example increasing flow, decreasing flow or other process variables. In such arrangements, the control is designed to provide modification in response to changes in the process variable in a selected range but a problem is encountered in the event of a rapid unanticipated change in the process variable under control, for example, a rapid increase or decrease in the process variable such as flow rate concentration or temperature.

Prior art systems can be modified and designed, to accomodate specified rates of change in such process variables but, the more sophisticated the controller system the more expensive the system. For example, differential controllers are known wherein correction is made in response to rate of change in the process variable where the magnitude of correction is determined by the time differential of the change in the process variable, that is the instantaneous rate of increase or decrease. Such devices are generally expensive and even where provided are subject to finite limitations.

Other applications are known where a normal condition exists but is subject to rapid change without advance notice and where correction is needed only in the event of such unexpected change. Such arrangements are commonly found in waste treatment process plants and other applications where certain minimal conditions, such as pH or other such parameters must be maintained and where the condition of the effluent stream is modified by addition of a second stream of selected pH to maintain the effluent stream above a given pH. However, in the event of an upset of a process or change in the condition of the second stream, the condition of the effluent falls below the prescribed minimum and rapid corrective action is required.

SUMMARY OF THE INVENTION

The present invention provides an inexpensive, straight-forward control method and apparatus which can be particularly useful as a supplemental control for installation with a primary control to avoid the use of an unduly expensive primary control medium means. Additionally, devices within the scope of the present invention can be used as a primary control and are particularly useful in situations where the need exists for the anticipation of, and rapid compensation for, a change in a process variable where the variable would ultimately decrease below a prescribed minimum, or where any rapid change in a process variable is undesirable and where upon such change rapid response must be provided.

It is recognized that devices within the scope of the present invention are also useful in thermal applications such as intermittent control of the flow rate of a heat transfer medium to a solar panel where radiant energy is received upon an absorber plate and the heat generated thereby is transfered to a liquid which flows through a coil located in heat conductive relation with the absorber plate. During certain portions of the day the temperature of the fluid circulating through the collector system is heated to the absorber temperature at which time no further heating occurs so that a portion of the heat received by the absorber plate is rejected. Within the scope of the present invention means are provided to increase the flow rate of the heat transfer fluid to the solar collector during the such times of the day to increase the heat recovery and maintain the outlet temperature of the solar collector.

It is further recognized that devices within the scope of the present invention are equally useful in certain process applications, for example in chemical processes, where a process variable is to be controlled and where the primary control system untilized is incapable of compensating for rapid rate of change of the process variable. In such instances, devices within the scope of the present invention can be provided to assis the primary control means.

It is further recognized that devices within the scope of the present invention provide an inexpensive method and arrangement for maintaining a certain minimum level of a process variable where the variable is normally self-maintaining above a predetermined minimum but with deviations in the process, the process variable moves toward the predetermined minimum and must be corrected prior to the coincidence of the actual process variable and the preselected minimum.

More particularly, the present invention provides a control method and apparatus for operating process controller means to initiate corrective action to maintain a selective process condition in a selected range including first sensor means to sense the process condition and to provide a first process condition output signal, second sensor means to sense a second condition which affects the process condition and to provide a second condition output signal, amplifier means to selectively amplify the process condition output signal to provide a modified process condition output signal, summing means to selectively sum the process condition output signal and the second condition output signal and provide a reference signal, comparator means to compare the modified process condition output signal and the reference signal to provide a first comparator output signal and provide a reference signal, comparator means to compare the modified process condition output signal and the reference signal to provide a first comparator output signal when the modified process condition output signal exceeds the reference signal and provide a second output signal when the reference signal exceeds the modified process condition output signal, operator means to receive the first and second output signals and selectively actuate the process controller means in response to one of the first and second output signals to modify the process condition.

In accordance with one feature of the present invention it has been found that the utilization of process control by means of a modified signal based on the process condition and a second signal which is a function of the process condition and a second variable which affects the process condition unexpectedly provides a means for anticipating the need for corrective action in a response to a rate of change of the process variable which would, if unheeded, cause the process variable to exceed prescribed limits and is particularly useful in arrangements where a primary control system is utilized which is incapable of maintaining control of the process variable within the prescribed limits in response to certain rates of change of the process variable.

Examples in accordance with the present invention are illustrated in the accompanying figures but it will be recognized that various other arrangements also within the scope of the present invention will occur to those skilled in the art upon reading the disclosure set forth hereinafter.

BRIEF DESCRIPTION OF THE DRAWINGS

In the drawings:

FIG. 1 is an illustration of an application of the method and apparatus of the present invention utilized in a control system for a solar heating process;

FIG. 2 is a graphic illustration of one mode of operation of a device shown in FIG. 1;

FIG. 1 is an illustration of one arrangement within the scope of the present invention utilized in a solar heating application. In the arrangement shown in FIG. 1 a solar collector 1 is shown having a collector panel 2 which receives radiation 3 from the sun and is warmed. Collector 2 further includes a fluid inlet 4 to receive a heat transfer medium for example water, to receive heat from absorber plate 2 of collector 1 where the heated fluid is emitted from an outlet 6 to supply useful heat for example for storage or direct use.

Figure 3:
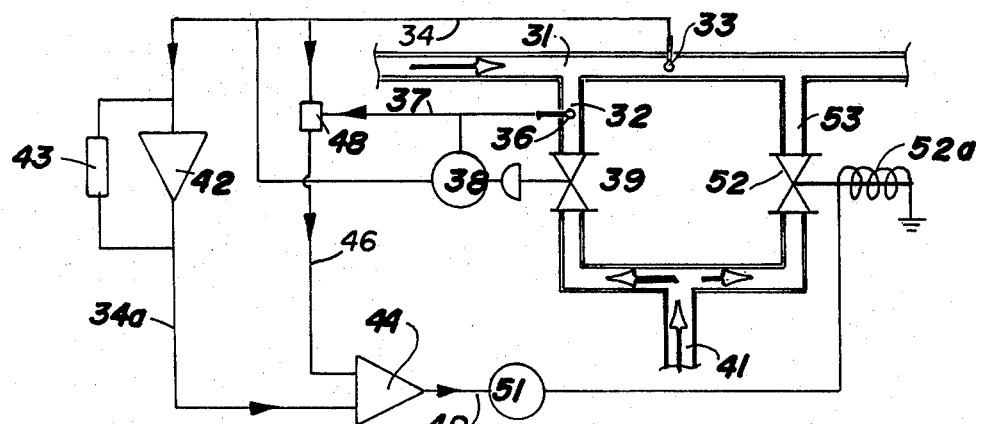
FIG. 3 is a schematic illustration of one example of a method and apparatus within the scope of the present invention utilized in the control of a chemical process.

Heat transfer medium is supplied to inlet 4 from a pump 7 provided with a fluid inlet 8 where the inlet fluid can come for example either from a reservoir or a direct supply of water. In the arrangement shown a throttle valve 9 is provided in series with inlet 4 and pump 7 to adjust the rate of flow of heat transfer medium to collector 1. In prior practice, the rate of flow of fluid through valve 9 is selected to provide optimum operating characteristics for collector 1 under specific conditions. However, with fixed flow of heat transfer medium, during certain portions of the day the temperature of the fluid circulating through the collector 1 reaches the absorber temperature prior to emission from the collector at which time no further heating occurs so that a portion of the heat received by the absorber plate is rejected. At other times of the day particularly the early morning and late evening, the temperature of the fluid emitted from outlet 6 is substantially below the temperature of the absorber plate because of the high flow rate of liquid needed to minimize heat rejection at the maximum collector temperature. Accordingly, the temperature of the fluid emitted from outlet 6 during a portion of the day is quite low and in many instances below a useful temperature.

The present invention provides a means to provide increased heat transfer fluid flow during the time of the day when the temperature of the heat transfer medium at outlet 6 approaches the temperature of the absorber plate 2 and to reduce the flow rate of the heat transfer medium during the balance of the day to provide increased temperature in the fluid emitted from outlet 6.

As shown in FIG. 1, a temperature sensor 11 is provided in outlet 6 to provide a signal 12. A second temperature sensor 13 is provided at absorber plate 2 to provide an output signal 14. When readily available thermocouples are used signals 12 and 14 are in the millovolt range. Within the scope of the present invention an amplifier 16 is provided with a gain circuit 17 to selectively increase the signal 14 to provide a modified signal 14a where it has been found that the gain of amplifier 16 can be in the range of 0.2 upwards. Signal 14a is supplied to one input of a comparator 22.

Also signal 14 is further supplied by means of line 19 to be combined with signal 12 to provide a modified signal 20, which can, for example be supplied through a resistor 21 of selected characteristics to an input of a comparator 22. Signal 14a is supplied to the other input to comparator 22, for example a type LM 339 which can within the scope of the present invention be provided with hysteresis loop 23 to prevent chatter.

The output 26 from comparator 22 is supplied to a controller 27 as shown where the output 28 from controller 27 is supplied to a power relay 29 of a solenoid valve 29 as shown which is in a bypass loop 31 around valve 9.

Bypass loop 31 and valve 29 are provided to, as hereinafter described, supply additional heat transfer medium to inlet 4 at the occurrence of certain conditions.

FIG. 2 is an illustration of the various temperatures of a typical solar heat transfer system throughout the course of a period of time, for example a day. The various tempratures are reflected in the lower portion of FIG. 2, that is reference 12' reflects the temperature of the heat transfer medium at outlet 11 both in degrees and in millivolts of the signal from a copper constantan thermocouple. Likewise reference numeral 14' represents the temperature of the absorber plate 2 of collector 1 in terms of temperature and millivolts for a copper-constantan sensor.

Curve 20' represents the signal in millivolts of the signal 20 which is the additive values of signal 12 and 14. Curve 14a' represents the signal provided by signal 14a in terms of millivolts for a gain of 1.9 in amplifier 16.

With reference to the Figures it will be noted that curves 12' and 14' are coincident between points A and B which is the portion of the day during which heat will be rejected by the fluid passing through collector 1 because of the coincidence of the temperature of the fluid at outlet 11 and the absorber plate temperature.

With reference to Curves 14a' and 20' it will be seen that early and late in the period curve 14a' is above curve 20' during which time valve 29 would be closed.

Curves 14a' and 20' are coincident at point C at which time valve 29 would open to permit flow of additional heat transfer medium. Curve 14a' is representative of a situation which would pertain if additional fluid were not provided and in the vent of cycling the temperature which the heat transfer medium at outlet 11 would approach so that the system would be reactivated to again open valve 29. Valve 29 would be open during the period until point D is reached where point 14a' and 20' are again coincident and curve 14a' is higher than a curve 20' at which time valve 29 would be closed to permit decrease of flow of heat transfer medium to heat collector 1 and permit the maximization of the heat transfer fluid temperature at outlet 11.

While the foregoing example is of somewhat simiplified form it nonetheless illustrates one principle of the present invention. It will be recognized that in practice the hysteresis loop 23 provided to comparator 22 would permit some cycling of the output 26 from comparator 22 but with proper hysteresis and proper selection of the flow rate of heat transfer means such cycling could be minimized.

Referring now to FIG. 3, which shows another example of an arrangement within the scope of the present invention wherein a device within the scope of the present invention is utilized to control a process, a process stream 31 is provided wherein a selected varible is to be controlled as discussed hereinafter. In the arrangement shown a second stream is provided from a source 41 with an inlet 32 to be mixed with the process stream 31 where the second stream provided by conduit 32 incorporates a material which affects the process variable. For example, process 31 can be intended to have a certain minimum pH which is continually modified by addition of a stream of variable pH from conduit 32. A sensor 33 is provided in conduit 31 to determine the pH of the stream and provide a signal 34. Likewise a sensor 36 can be provided in conduit 32 to sense the pH of the material to be added into the conduit 31 and to provide a signal 37. Signals 34 and 37 are then provided to a controller 38 as is known in the art to operate a valve 39 which controls a rate of flow of the additive materials from a source 41.

Within the scope of the present invention, output signal 34 is also supplied to an amplifier 42 having a gain device 43 as previously described to provide a modified output signal 34a to one input of a comparator 44 as previously described. As also previously described with reference to FIG. 1 in a similar situation a second signal 46 is provided by the summation of signal 34 and signal 37 in a summing device 48 and is supplied to the other input of comparator 44. Comparator 34 provides an output signal 49 which is supplied to a controller 51 which operates a valve 52 in a bypass 53 which communicates with a source 41 of additive material.

Figure 4:
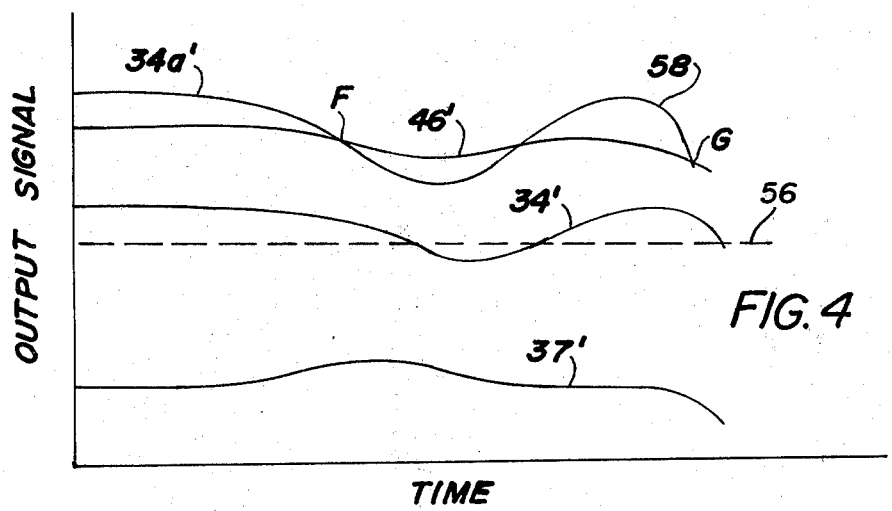
FIG. 4 is a graphic illustration of a mode of operation of the arrangement shown in FIG. 1.

FIG. 4 is a characterization of the response in the arrangement shown in FIG. 3. In FIG. 4 a plot is shown of time versus output signal value for example millivolts. In the illustration of FIG. 4 a desired minimum set point 56 is provided where it is desired that output signal 34 representing the control process variable be maintained above the set point. Output signal 34 is represented by line 34' of FIG. 4 and the output signal 37 from sensor 36 is represented by line 37' of FIG. 4. Likewise the output 34a from amplifier 42 is represented by line 34a' and signal 46 is represented by line 46' which is the sumation of signals 34' and 37'.

It will be noted that the line 34a' representing the amplifier signal from amplifier 32 is above line 46' representing the sumation of the signals 37 and 34 until point F at which time the lines 34a' and 46' cross. At this time the control system provided by the present invention has anticipated the process going out of control even though line 34' has not yet crossed the set point 56. In the hypothetical example shown the continuation of process line 34' goes below set point 56 and returns to the proper range. It will be noted that in the example shown in FIG. 3 the return would have been expected to occur due to normal corrective action taken by the control valve 39 whereas in fact because of the rapid change in conditions the variable would have exceeded limits. However by opening of valve 52 the process would have in fact not gone below the set point and the control system provided by the present invention would maintain the variable within limits until normal control function came into balance.

A similar situation occurs at point G wherein the curve 34a' commenced a sharp downturn at point 58 which was anticipated by the control means even though the output signal 37' was unchanged. As shown by the intersection of line 34a' and line 46' at point G the controller initiates corrective action prior to the point where line 34' crosses line 56.

Figure 5:
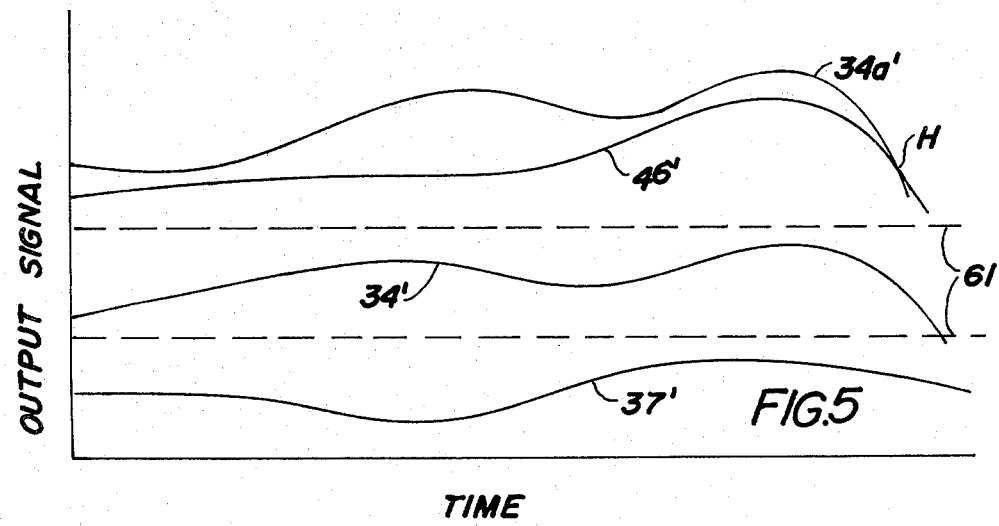
FIG. 5 is a graphic illustration of another mode of operation of an arrangement shown in FIG. 4.

FIG. 5 is an illustration of an arrangement where signal 34' is to be maintained within a proportional band 61 by means of control valve 39. In the arrangement shown in FIG. 5 signal 34a' and 46' are shown with appropriate deviations as a result of variations in signals 34' and 37'. It will once again be noted that an intersection H between lines 34' and 46' occurs in anticipation of out of range performance of signal 34' prior to the signal actually exceeding the limits.

It will be understood that the foregoing are but a few examples of arrangements within the scope of the present invention and that various other arrangements also within the scope of the present invention will also occur to those skilled in the art upon reading the disclosure set forth hereinafter.

The invention claimed is:

1. A control system for operating a process controller means to initiate corrective action to maintain a selective process condition in a selected range including first sensor means to sense the process condition and to provide a first condition output signal, second sensor means to sense a second condition which affects the process condition to provide a second condition output signal reflective of the second condition, amplifier means to amplify the first process condition output signal and provide a modified process condition output signal, summing means to sum the first condition output signal and the second condition output signal and provide a reference signal, comparator means to compare the modified process condition output signal and the reference signal to provide a first comparator output signal when the modified process output condition signal exceeds the reference signal and to provide a second output signal when the reference signal exceeds the modified process signal, operator means to receive the first and second output signals and selectively operate the process controller means in response to the first and second output signals to modify the process condition in response thereto.

2. The invention of claim 1 wherein said first condition output signal and said second condition output signal are summed by addition.

3. The invention of claim 1 wherein said first condition output signal and said second condition output signal are summed by subtraction.

4. The invention of claim 1 including solar collector means having air absorber plate to receive solar energy with heat transfer medium inlet means and heat transfer medium outlet means where said solar energy received by said absorber plate is transfered to said heat transfer medium flowing through said solar collector, source of heat transfer medium to supply said heat transfer medium to said heat transfer medium inlet means, first valve means to selectively control flow of heat transfer medium to said solar collector, second valve means to selectively supply additional heat transfer medium to said heat transfer medium inlet means wherein said second conditin is the temperature of said heat transfer medium at said heat transfer medium outlet means of said solar collector means and said process condition is reflective of the temperature of said absorber plate.

5. The invention of claim 1 wherein said amplifier means includes gain means to selectively adjust the gain of said amplifier means.

6. The invention of claim 1 wherein said comparator means includes hysterisis means to selectively delay change between said first comparator output signal and said second comparator output signal.

7. The invention of claim 1 wherein said process condition is a measured variable in a flowing process stream and where said second condition is a similar varible in a second stream mixed with said process stream wherein valve means are provided to be operated by said process controller to selectively admit additional quantity of said second stream in response to one of said first and second output signals.

* * * * *